Patented Feb. 6, 1934

1,946,053

UNITED STATES PATENT OFFICE 1,946,053

PIGMENT

Julian T. Baldwin, West Chester, Pa., assignor to Sandura Company, Inc., Paulsboro, N. J., a corporation of New Jersey No Drawing. Original application October 12, 1929, Serial No. 399,394. Divided and this application September 27, 1930. Serial No. 484,938. Renewed June 13, 1933

2 Claims. (Cl. 134—58)

This invention relates to improvements in the manufacture of pigments.

Among other features of the invention it is desired to so modify the surface energy characteristics of ordinary pigments as to give these pigments greatly improved qualities not hitherto attainable.

The present invention is a division of my copending application, Serial No. 399,394, filed October 12, 1929.

Heretofore the qualities of pigments have depended largely on the materials from which the pigments have been made, and on the manner of making them. By the process of the present invention, on the other hand, any kind of pigment, no matter how it has been made, may be treated by a process entirely separate from and independent of its own manufacture, whereby its qualities become greatly improved.

Some of the advantages of pigments treated in accordance with the present invention are:
1. Better color tone;
2. Greater ease of dispersion;
3. Control of yield value in plastic systems;
4. Better adhesion between pigment and binder or vehicle;
5. Better distribution of particle size;
6. Greater abrasion resistance and tensile strength of their plastics;
7. Smoother and glossier paints and plastics; and
8. Easy removal of moisture.

The surface energy characteristics of pigments play an important part in determining the properties of the pigment when in contact with a binding medium. Settling, cohesion, flocculation, gloss, weathering and abrasion resistance are all functions of the surface energy characteristics. Thus a lead paint on exposure chalks while a zinc oxide paint fails by cracking largely due to the different surface energy characteristics of the two pigments.

Pigments may have their surface energy characteristics greatly modified by coating their surfaces with a thin film of certain organic compounds. However it is very necessary that the material used for coating the pigment remain at the pigment binder interface if it is to have the desired effect. If the material is removed by the binding agent from the interface as would be an ordinary resin if it were used for coating, its effect would only be the same as if the same amount of resin was originally dissolved in the oil or binding medium. Or if the pigment were coated with an oil and the oil subsequently oxidized, the adhesion between the pigment and the oil in a paint would be very much the same as if the oil had been added to the pigment in the usual manner. That is, the interface would be between oil and pigment whether the pigment was added to the oil all at once or if the surface of pigment had been covered with oil which was then oxidized and the resulting coated pigment added to the main body of oil to form the paint.

I have found however that the most desirable and permanent modification of the surface energy characteristics is obtained by causing precipitated suspensions of water repellent metallic organic compounds to become adherent upon the surface of the pigment in the form of a thin film covering each pigment particle. In the first place, the most desirable metallic organic compounds as zinc stearate, calcium oleate or aluminium stearate or resinate are insoluble in water and water repellent. And then it does not seem advisable to coat a pigment with a water soluble coating that is permanent since this would greatly destroy the waterproofing qualities of the paint film, linoleum or rubber product. In order to reduce the tendency for these metallic compounds to be removed from the pigment binder interface it is sometimes advisable to precipitate glue or calcium caseinate in conjunction with them. These materials are rendered insoluble in water to secure their precipitation. The coating material is always of different derivation from the pigment itself, being formed by a process entirely separate and independent from the process of chemical formation of the pigment.

The general procedure in treating pigments by my process is to place the pigment in an aqueous suspension containing a potassium or sodium or other organic water dispersible compound in a quantity equivalent to form a soap 0.2% to 2% of the weight of the pigment introduced. This suspension of pigment is well mixed or may be ground in a colloid mill. Then is added the precipitating agent, a metallic salt, in a proportion to cause the precipitation of a suspension of the water repellent metallic organic compound formed by the reaction of the precipitating agent on the dissolved or dispersed organic compound.

A specific example of proportions and materials used is as follows:

Into a revolving tube containing lithopone, said tube and contents being at a temperature of 550° F., are introduced the vapors from the distillation of blown soya bean oil at a temperature between 510° and 540° F. After the vapors have contacted with the pigment for from ten minutes to an hour, the vapors are cut off and unheated air is introduced slowly while the contents of the tube are cooled to 500° F. This temperature is maintained for half an hour, and the pigment after cooling is ready for shipment.

The purpose of this procedure is to absorb the organic acid vapors on the surface of the pigment, then lower the temperature of the pigment so that the vapors condense, then maintain a temperature slightly below the condensation point until the organic acid has formed a metallic compound through reaction with the pigment. The time required depends on the reactivity and surface of the pigment. Thus zinc oxide requires a very much shorter time than the lithopone, since the zinc oxide reaction is instantaneous. This process is described in greater detail in my copending application of even date, Serial No. 484,937.

In the above example all parts are by weight.

An advantage of the above procedure is to avoid contamination of the pigment with substances other than the desired soap. Thus when zinc chloride reacts with sodium palmitate, zinc palmitate and sodium chloride are formed. If the water containing the sodium palmitate is not removed by settling and evaporation, more zinc chloride is required to precipitate the zinc palmitate, so that more sodium chloride is formed. This sodium chloride would have to be removed by washing.

In the example given linoleic and other fatty acids come in direct contact with the pigment and act directly upon it, thus precluding any impurities.

The proportion of pigment to coating agent depends on the specific surface of the pigment. The larger the specific surface the larger is amount of coating agent required to cover the surface.

It has been found that by using my process of treating pigment surfaces with water repellent materials the usual process of freeing the pigment from water by evaporation may be done away with. In place of this expensive evaporation process, pigment which has been treated by my process may be freed from water by simply adding linseed oil to the wet pigment. My process has so decreased the affinity of the pigment for water and increased the affinity for oil, that the oil replaces the water, and the water is forced to the top of the suspension in a clear layer, and is removed by decantation.

Wherever the term "pigment" appears in the specification and claims, it is meant to include not only pigments as technically considered, but also all varieties of particles including fillers and other materials of similar nature. Likewise, wherever the word "film" appears in the specification and claims, it is meant to include a group of very small particles of the water-repellent compound contained or carried on the surface of the pigment.

I claim:

1. A pigment particle including available reactive zinc whose surface contains a water repellent zinc soap of blown soya bean oil in the form of a thin film covering the particle and adhering thereto.

2. A pigment particle including available reactive zinc whose surface contains a water repellent zinc soap of blown soya bean oil in the form of a thin film covering the particle and adhering thereto, the soap remaining at the pigment-binder interface upon the addition of a binder.

JULIAN T. BALDWIN.